US008524804B2

(12) United States Patent
Kitano et al.

(10) Patent No.: US 8,524,804 B2
(45) Date of Patent: Sep. 3, 2013

(54) SURFACE-TREATED FIBER, RESIN COMPOSITION, AND MOLDED ARTICLE OF THE COMPOSITION

(75) Inventors: Katsuhisa Kitano, Rabigh (SA); Kenji Watanabe, Ichihara (JP); Kenji Atarashi, Kimitsu (JP); Shinichi Takahashi, Ibaraki (JP)

(73) Assignees: Sumitomo Chemical Company, Limited, Tokyo (JP); Teijin Fibers Limited, Osaka (JP)

( * ) Notice: Subject to any disclaimer, the term of this patent is extended or adjusted under 35 U.S.C. 154(b) by 202 days.

(21) Appl. No.: 12/864,136

(22) PCT Filed: Jan. 22, 2009

(86) PCT No.: PCT/JP2009/051387
§ 371 (c)(1),
(2), (4) Date: Oct. 12, 2010

(87) PCT Pub. No.: WO2009/093748
PCT Pub. Date: Jul. 30, 2009

(65) Prior Publication Data
US 2011/0136951 A1 Jun. 9, 2011

(30) Foreign Application Priority Data
Jan. 24, 2008 (JP) .................. 2008-013517

(51) Int. Cl.
*C08K 9/08* (2006.01)
(52) U.S. Cl.
USPC ............... 523/201; 523/205; 523/206
(58) Field of Classification Search
USPC .................. 523/201, 205, 206
See application file for complete search history.

(56) References Cited

U.S. PATENT DOCUMENTS

| 2004/0002569 A1* | 1/2004 | Kitano et al. ............... 524/494 |
| 2011/0014454 A1* | 1/2011 | Yamamoto et al. ....... 428/311.51 |
| 2011/0293913 A1* | 12/2011 | Watanabe et al. .......... 428/297.4 |

FOREIGN PATENT DOCUMENTS

| EP | 2 096 134 A1 | 9/2009 |
| JP | 61-287917 A | 12/1986 |
| JP | 03-121146 A | 5/1991 |
| JP | 03-272830 A | 12/1991 |
| JP | 04-323207 A | 11/1992 |
| JP | 2001-049012 A | 2/2001 |
| JP | 2002-005924 A | 1/2002 |
| JP | 2002-308947 A | 10/2002 |
| JP | 2004-083638 A | 3/2004 |
| JP | 2004-197068 A | 7/2004 |
| JP | 2004-217753 A | 8/2004 |
| JP | 2004-217754 A | 8/2004 |
| JP | 2004-292581 A | 10/2004 |
| JP | 2005-082786 A | 3/2005 |
| JP | 2005-272754 A | 10/2005 |
| JP | 2006-008995 A | 1/2006 |
| JP | 2006-233379 A | 9/2006 |
| JP | 2007-153993 A | 6/2007 |
| JP | 2007-224209 A | 9/2007 |
| WO | 2008056646 A1 | 5/2008 |

OTHER PUBLICATIONS

Int'l Search Report issued on Mar. 24, 2009 in Int'l Application No. PCT/JP2009/051387.
Int'l Preliminary Report on Patentability issued on Sep. 10, 2010 in Int'l Application No. PCT/JP2009/051387.
A. Zambelli et al., "Carbon-13 Observations of the Stereochemical Configuration of Polypropylene", Macromolecules Communications to the Editor, vol. 6, No. 6, pp. 925-926, (1973).
A. Zambelli et al., "Model Compounds and 13C NMR Observations of Stereosequences of Polypropylene", Macromolecules Communications to the Editor, vol. 8, No. 5, pp. 687-689, (1975).
Y. Saeki, "New Polymer Production Process", Institute of Industrial Research, pp. 128-148 (1994), (with a partial translation of pertinent portions).
G. Moad, "The synthesis of polyolefin graft copolymers by reactive extrusion", Progress in Polymer Science, vol. 24, Issue 1, pp. 81-142 (1999) (Only English Abstract cited).
F. Ide, "Practical Polymer Alloy Design", Institute of Industrial Research, pp. 29-64 (1996), (Partial English translations of pertinent portions).

* cited by examiner

*Primary Examiner* — Vickey Nerangis
(74) *Attorney, Agent, or Firm* — Panitch Schwarze Belisario & Nadel LLP

(57) ABSTRACT

A resin composition includes a fiber and a polyolefin resin and can provide a molded article having excellent mechanical strength such as flexural strength and impact resistance. The resin composition includes (i) a surface-treated fiber (A) which comprises 100 parts by weight of a fiber (A-I) comprising a polyalkylene terephthalate and/or a polyalkylene naphthalene dicarboxylate and 0.1 to 10 parts by weight of a sizing agent (A-II) adhered to the surface of the fiber (A-I), and (ii) a polyolefin resin modified with an unsaturated carboxylic acid and/or an unsaturated carboxylic acid derivative (a modified polyolefin resin (B)) as a resin component.

7 Claims, No Drawings

SURFACE-TREATED FIBER, RESIN COMPOSITION, AND MOLDED ARTICLE OF THE COMPOSITION

CROSS-REFERENCE TO RELATED APPLICATION

This application is a section 371 of International Application No. PCT/JP2009/051387, filed Jan. 22, 2009, which was published in the Japanese language on Jul. 30, 2009 under International Publication No. WO 2009/093748 A1 and the disclosure of which is incorporated herein by reference.

TECHNICAL FIELD

The present invention relates to a surface-treated fiber, a polyolefin resin composition comprising the surface-treated fiber, and a molded article of the composition.

BACKGROUND ART

Heretofore, a large number of molding materials comprising a filler and a fiber have been proposed as means of improving the mechanical strength such as stiffness and impact resistance of a polyolefin resin.

Due to a growing cry for environmental protection, light-weight parts are now strongly desired. As one of measures for this, it is proposed to improve the mechanical strength such as stiffness and impact strength of a polyolefin resin by mixing a polyester fiber.

For example, Patent Document 1 proposes a fiber-reinforced pellet containing a polyolefin resin as a matrix component and a synthetic organic fiber as a reinforcing fiber.

Patent Document 2, Patent Document 3 and Patent Document 4 propose resin compositions comprising a polyalkylene naphthalate (polyalkylene naphthalene dicarboxylate) fiber and a polypropylene resin as resin compositions having improved mechanical strength and heat resistance.

(Patent Document 1) JP-A 2001-49012
(Patent Document 2) JP-A 2005-272754
(Patent Document 3) JP-A 2006-8995
(Patent Document 4) JP-A 2006-233379

However, the resin compositions disclosed by the above publications are still unsatisfactory in terms of mechanical strength such as flexural strength and impact resistance.

DISCLOSURE OF THE INVENTION

In view of the above situation, it is an object of the present invention to provide a resin composition which comprises a fiber and a polyolefin resin and provides a molded article having excellent mechanical strength such as flexural strength and impact resistance.

The inventors of the present invention have conducted intensive studies in view of the above situation and have found that, when a fiber surface treated with a sizing agent is contained in a polyolefin resin modified with an unsaturated carboxylic acid and/or an unsaturated carboxylic acid derivative, a molded article having excellent mechanical strength is obtained. The present invention has been accomplished based on this finding.

That is, the present invention is a resin composition comprising (i) a surface-treated fiber (A) which comprises 100 parts by weight of a fiber (A-I) comprising a polyalkylene terephthalate and/or a polyalkylene naphthalene dicarboxylate and 0.1 to 10 parts by weight of a sizing agent (A-II) adhered to the surface of the fiber (A-I), and
(ii) a polyolefin resin modified with an unsaturated carboxylic acid and/or an unsaturated carboxylic acid derivative (a modified polyolefin resin (B)) as a resin component.

The present invention further includes a molded article obtained from the above resin composition.

Further, the present invention includes a surface-treated fiber (A) which comprises 100 parts by weight of a fiber (A-I) comprising a polyalkylene terephthalate and/or a polyalkylene naphthalene dicarboxylate and 0.1 to 10 parts by weight of a sizing agent (A-II) adhered to the surface of the fiber (A-I).

BEST MODE FOR CARRYING OUT THE INVENTION

<Surface-Treated Fiber (A)>
The surface-treated fiber (A) of the present invention comprises 100 parts by weight of a fiber (A-I) comprising a polyalkylene terephthalate and/or a polyalkylene naphthalene dicarboxylate and 0.1 to 10 parts by weight of a sizing agent (A-II) adhered to the surface of the fiber (A-I).
(Fiber (A-I))
The fiber (A-I) comprises a polyalkylene terephthalate and/or a polyalkylene naphthalene dicarboxylate. Preferably, the fiber (A-I) comprises a polyalkylene naphthalene dicarboxylate.
(Polyalkylene Naphthalene Dicarboxylate)
The polyalkylene naphthalene dicarboxylate is preferably a polyester comprising alkylene-2,6-naphthalene dicarboxylate or alkylene-2,7-naphthalene dicarboxylate as the main recurring unit. The content of the alkylene naphthalene dicarboxylate in the polyester is preferably not less than 90 mol %, more preferably not less than 95 mol %, much more preferably 96 to 100 mol %.

The alkylene group is preferably an alkylene group having 2 to 4 carbon atoms. Examples of the alkylene group include ethylene group, trimethylene group and tetramethylene group. The alkylene group may be a cycloalkylene group. The polyalkylene naphthalene dicarboxylate is preferably polyethylene naphthalene dicarboxylate, more preferably polyethylene-2,6-naphthalene dicarboxylate.
(Polyalkylene Terephthalate)
The polyalkylene terephthalate is preferably a polyester comprising alkylene-terephthalate as the main recurring unit. The content of the alkylene terephthalate in the polyester is preferably not less than 90 mol %, more preferably not less than 95 mol %, much more preferably 96 to 100 mol %.

The alkylene group is preferably an alkylene group having 2 to 4 carbon atoms. Examples of the alkylene group include ethylene group, trimethylene group and tetramethylene group. The alkylene group may be a cycloalkylene group. The polyalkylene terephthalate is preferably polyethylene terephthalate.

Another unit (third component) maybe included in the recurring units of the fiber (A-I) if it is small in quantity. An example of the third component is (a) a compound having two ester forming functional groups. Specific examples of the compound include aliphatic dicarboxylic acids such as oxalic acid, succinic acid, sebacic acid and dimer acid, alicyclic dicarboxylic acids such as cyclopropanedicarboxylic acid and hexahydroterephthalic acid, aromatic dicarboxylic acids such as phthalic acid, isophthalic acid, naphthalene-2,7-dicarboxylic acid and diphenylcarboxylic acid, and other carboxylic acids such as diphenyl ether dicarboxylic acid, diphenylsulfonic acid, diphenoxyethanedicarboxylic acid and sodium 3,5-dicarboxybenzenesulfonate. Oxycarboxylic acids such as glycolic acid, p-oxybenzoic acid and p-oxyethoxybenzoic acid are also included. Oxy compounds such as propylene glycol, trimethylene glycol, diethylene glycol, tetramethylene glycol, hexamethylene glycol, neopentylene glycol, p-xylene glycol, 1,4-cyclohexanedimethanol, bisphenol A, p,p'-dihydroxyphenylsulfone, 1,4-bis(β-hydroxyethoxy)benzene, 2,2-bis(p-(β-hydroxyethoxyphenyl)propane and polyalkylene glycol are further included. Functional derivatives thereof are still further included. Compounds having a high degree of polymerization derived from the above carboxylic acids, oxycarboxylic acids, oxy compounds and functional derivatives thereof are still further included.

Another example of the third component is (b) a compound having one ester forming functional group. Specific examples of the compound include benzoic acid, benzyloxybenzoic acid and methoxypolyalkylene glycol.

(c) A compound having 3 or more ester forming functional groups such as glycerin, pentaerythritol or trimethylolpropane may also be used as long as the polymer is substantially linear. These polyesters may contain a delustering agent such as titanium dioxide and a stabilizer such as phosphoric acid, phosphorous acid or an ester thereof.

When the fiber (A-I) is mixed with a resin and molded, it has high resistance to a mechanical impact and high affinity for a resin as its modulus is relatively low at a high-temperature range, and its reinforcing effect is efficiently obtained as its modulus is high at a low-temperature range at which it is actually used.

The filament fineness of the fiber (A-I) is preferably 1 to 30 dtex, more preferably 3 to 15 dtex. The upper limit value of the filament fineness is preferably 20 dtex, more preferably 16 dtex. The lower limit value of the filament fineness is preferably 2 dtex. The object of the present invention is easily attained when the filament fineness falls within the above range. When the filament fineness is less than 1 dtex, a yarn-making problem tends to occur and when the fineness is too large, interface strength between the fiber and the resin tends to lower. The fineness is preferably large from the viewpoint of the dispersion of the fiber but preferably smaller than a certain value from the viewpoint of the reinforcing effect.

The intrinsic viscosity of the fiber (A-I) is preferably not less than 0.7, more preferably 0.7 to 1.0. The intrinsic viscosity is a value obtained from viscosity measured at 35° C. when the fiber is dissolved in a mixed solvent of phenol and orthodichlorobenzene (volume ratio of 6:4). When the intrinsic viscosity is less than 0.7, not only the strength and toughness of the fiber but also the heat resistance of the fiber tend to degrade. When the fiber has an intrinsic viscosity higher than 1.0, a failure readily occurs in the spinning step, and it is difficult to produce a fiber.

The tensile strength of the fiber (A-I) is preferably 6 to 11 cN/dtex, more preferably 7 to 10 cN/dtex. When the tensile strength is less than 6 cN/dtex, the tensile strength of the resin composition tends to lower. The tensile modulus of the fiber (A-I) is preferably 18 to 30 GPa, more preferably 20 to 28 GPa. When this value is small, the flexural strength of the resin composition is apt to lower.

The dry heat shrinkage factor at 180° C. of the fiber (A-I) is preferably not more than 8%, more preferably not more than 7%. When the dry heat shrinkage factor exceeds the dimensional change of the fiber by heat at the time of molding becomes large, thereby producing not only a defective shape of the molding of the resin composition but also a space between the resin and the fiber with the result of a reduced reinforcing effect.

The fiber (A-I) having such strength can be produced by a conventionally known method. That is, the fiber (A) can be obtained by further carrying out the solid-phase polymerization of a polyalkylene terephthalate and/or polyalkylene naphthalene carboxylate chip(s) obtained by polymerization to fully increase its intrinsic viscosity, melt spinning the chip(s) into yarn and stretching the obtained yarn.

Preferably, spinning is carried out to obtain a multi-filament fiber, the total fineness of the multi-filament fiber is 500 to 50,000 dtex, and the number of filaments is 25 to 25,000.

Unstretched yarn is taken up and stretched separately to produce a fiber after spinning. The fiber may also be produced by stretching the unstretched yarn continuously without taking it up. The obtained fiber has a high modulus and excellent dimensional stability.

<Sizing Agent (A-II)>

The surface-treated fiber (A) comprises 0.1 to 10 parts by weight, preferably 0.1 to 3 parts by weight of a sizing agent (A-II) which is adhered to 100 parts by weight of the fiber (A-I).

Examples of the sizing agent (A-II) include polyolefin resin, polyurethane resin, polyester resin, acrylic resin, epoxy resin, starch, vegetable oil and mixtures of an epoxy compound and any one of these. The sizing agent (A-II) preferably contains at least one resin selected from the group consisting of polyolefin resin, polyurethane resin and mixtures thereof.

(Polyolefin Resin)

The polyolefin resin as the sizing agent (A-II) is preferably an olefin homopolymer or a copolymer of two or more olefins. Specific examples of the polyolefin resin include polyethylene, polypropylene, polymethylpentene, ethylene-propylene random copolymer, ethylene-propylene block copolymer, ethylene-cc-olefin copolymer and propylene-α-olefin copolymer. The polyolefin resin is preferably a polyethylene resin or a polypropylene resin.

The polyolefin resin is preferably an acid-modified polyolefin resin obtained by modifying the above polyolefin resin with an acid component.

An example of the acid-modified polyolefin resin is a sulfonated polyolefin resin. The sulfonated polyolefin resin can be produced by chlorosulfonating an olefin resin and then converting the chlorosulfone group into a sulfone group, or by directly sulfonating an olefin resin. That is, the sulfonated polyolefin resin is obtained by reacting an olefin resin with chlorine and sulfur dioxide, or chlorosulfonic acid to chlorosulfonate the olefin resin and converting the chlorosulfone group into a sulfone group. The sulfonated olefin resin is also obtained by directly sulfonating an olefin resin. Out of these, sulfonated polyethylene and sulfonated polypropylene are preferred.

Another example of the acid-modified polyolefin resin is a resin obtained by modifying a polyolefin resin with an unsaturated carboxylic acid and/or an unsaturated carboxylic acid derivative.

Examples of the unsaturated carboxylic acid used for modification with carboxylic acid include maleic acid, fumaric acid, itaconic acid, acrylic acid and methacrylic acid. The unsaturated carboxylic acid derivative is, for example, an anhydride, ester, amide, imide or metal salt of any one of these acids. Specific examples of the unsaturated carboxylic acid derivative include maleic anhydride, itaconic anhydride, methyl acrylate, ethyl acrylate, butyl acrylate, glycidyl acrylate, methyl methacrylate, ethyl methacrylate, glycidyl methacrylate, maleic acid monoethyl ester, maleic acid diethyl ester, fumaric acid monomethyl ester, fumaric acid dimethyl ester, acrylamide, methacrylamide, maleic acid monoamide, maleic acid diamide, fumaric acid monoamide, maleimide, N-butylmaleimide and sodium methacrylate. Out of these compounds, compounds having no free carboxylic acid group are hydrolyzed to produce a carboxylic acid group after polymerization. Out of these unsaturated carboxylic acid compounds and derivatives thereof, most preferred are glycidyl esters of acrylic acid and methacrylic acid and maleic anhydride in the present invention.

The carboxylic acid-modified polyolefin resin can be produced by copolymerizing an olefin with a polymerizable unsaturated carboxylic acid or a derivative thereof at the time of producing an olefin resin. That is, it can be produced by random or block copolymerizing at least one olefin monomer with at least one unsaturated carboxylic acid compound or derivative thereof. The obtained polyolefin resin may be further graft polymerized with an unsaturated carboxylic acid or a derivative thereof. Out of these, an acid-modified polyolefin resin obtained by copolymerizing an olefin monomer comprising ethylene and/or propylene as the main constituent unit(s) with a (meth)acrylic acid glycidyl ester or maleic anhydride is preferred.

The carboxylic acid-modified polyolefin resin may also be produced by graft polymerizing an olefin homopolymer or a copolymer of two or more olefins with an unsaturated carboxylic acid compound or a derivative thereof. A carboxylic acid-modified polyolefin resin obtained by graft polymerizing a polyolefin resin comprising ethylene and/or propylene as the main constituent unit(s) with maleic anhydride is particularly preferred. By using this polyolefin resin, high adhesion between the fiber and the resin component can be obtained. The polyolefin resin having a weight average molecular weight of 1,000 to 10,000 is preferred because its adhesion to the fiber is high. The weight of a carboxylic acid component such as maleic anhydride which is graft polymerized with the polyolefin resin is preferably 0.01 to 20 wt % based on the polyolefin resin.

The weight average molecular weight of the polyolefin resin is preferably not less than 500, more preferably not less than 1,000, much more preferably 2,000 to 150,000. When the weight average molecular weight is less than 500, the strength of the coating film of the polyolefin resin formed on the fiber is low and the satisfactory compatibility with and adhesion to the reinforced resin of the fiber are apt to be hardly obtained.

The softening and melting temperature of the polyolefin resin is preferably 80 to 160° C., more preferably 90 to 150° C., much more preferably 100 to 140° C. When the temperature is lower than 80° C., the resin readily falls off in the drying stage in the dipping step and also the fallen resin adheres to the roller or guide of the dipping equipment in large quantity, thereby greatly deteriorating step passability. When the temperature is higher than 160° C., the resin is hardly softened and molten by a heat treatment in the dipping step, thereby making it difficult for the resin to spread to each filament of the fiber. Since the resin has an appropriate softening and melting temperature, the resin is molten by the heat treatment in the dipping step, uniformly spreads to each filament of the fiber and normally serves to bundle the fibers.

The deposition amount of the polyolefin resin as the sizing agent (A-II) is 0.1 to 10 parts by weight, preferably not less than 0.2 part by weight, more preferably 0.3 to 3.0 parts by weight based on 100 parts by weight of the fiber (A-I). When the deposition amount of the polyolefin resin is less than 0.1 part by weight based on 100 parts by weight of the fiber, the resin reinforcing effect tends to lower. When the deposition amount is too large, the filaments constituting the fiber are fixed by the resin, the fiber becomes hard, and the lubricity of the fiber greatly degrades, whereby the filaments are broken by the guide in contact therewith during molding, dispersibility into the matrix resin degrades, yarn break often occurs, and productivity tends to lower.

(Mixture of Polyolefin Resin and Epoxy Compound)

The sizing agent (A-II) is preferably a mixture of a polyolefin resin and an epoxy compound having two or more epoxy groups in one molecule. The polyolefin resin is as described above.

Examples of the epoxy compound include glycidyl ether compounds such as glycerol polyglycidyl ether, diglycerol polyglycidyl ether, polyglycerol polyglycidyl ether and sorbitol polyglycerol glycidyl ether. Glycidyl ether compounds are particularly preferred because they can increase adhesive force to the resin. These epoxy compounds may be used alone or in combination of two or more.

The deposition amount of the epoxy compound is preferably 0.1 to 1.0 part by weight, more preferably 0.2 to 0.8 part by weight based on 100 parts by weight of the fiber (A-I). When the deposition amount is smaller than 0.1 part by weight, the reinforcing effect of the fiber tends to lower. When the deposition amount is larger than 2.0 parts by weight, the epoxy compound falls on the guide in contact therewith during molding, dirt is produced, the filaments are broken, dispersibility into the resin component degrades, yarn break often occurs, and productivity tends to lower. This is because the filaments constituting the fiber are fixed by the resin and hardly dispersed into the resin to be reinforced.

Therefore, the content of the epoxy compound in the sizing agent (A-II) is preferably 1 to 50 parts by weight, more preferably 5 to 30 parts by weight based on 100 parts by weight of the polyolefin resin.

The surface-treated fiber (A) preferably comprises 100 parts by weight of the fiber (A-I), 0.1 to 2.0 parts by weight of a polyolefin resin modified with an unsaturated carboxylic acid and/or an unsaturated carboxylic acid derivative and 0.1 to 1.0 part by weight of an epoxy compound having two or more epoxy groups in one molecule.

(Mixture of Polyolefin Resin and Aliphatic Amine-Based Compound)

The sizing agent (A-II) is preferably a mixture of a polyolefin resin and an ethylene oxide adduct and/or propylene oxide adduct of an aliphatic amine compound. Preferably, it further comprises an epoxy compound. This sizing agent improves adhesion to the resin component. The polyolefin resin and the epoxy compound are as described above.

The aliphatic amine compound is preferably an aliphatic amine compound having 4 to 22 carbon atoms, more preferably an alkylamine compound having 4 to 22 carbon atoms. Examples of the alkyl group include butyl group, lauryl group, stearyl group and oleyl group.

2 to 20 moles of the ethylene oxide and/or propylene oxide adduct is preferably added to the aliphatic amine compound.

Examples of the ethylene oxide and/or propylene oxide adduct of the amine compound include POE(4-20)laurylamino ether, POE(20)stearylamino ether, POE(2-20)oleylamino ether, EO(5)/PO(4)monobutylamino ether, POE(2-20) laurylethanolamine and POE(2-20)lauryldiethanolamine. POE stands for polyoxyethylated, EO stands for ethylene oxide, and PO stands for propylene oxide, and the figures within the parentheses indicate the number of moles of ethylene oxide added. In the present invention, by using the ethylene oxide and/or propylene oxide adduct of the amine compound, the resin component reinforcing effect of the fiber can be enhanced.

The deposition amount of the ethylene oxide and/or propylene oxide adduct of the amine compound on the fiber is preferably 0.01 to 0.3 part by weight, more preferably 0.03 to 0.2 part by weight based on 100 parts by weight of the fiber. When the deposition amount is smaller than 0.01 part by weight based on 100 parts by weight of the fiber, the resin reinforcing effect tends to lower. When the deposition amount is larger than 0.3 part by weight, the fiber becomes hard and the lubricity of the fiber greatly lowers, whereby the filaments are broken by the guide in contact therewith during molding, dispersibility into the matrix resin degrades, yarn break often occurs, and productivity tends to lower.

Therefore, the content of the ethylene oxide and/or propylene oxide adduct of the aliphatic amine compound in the sizing agent (A-II) is preferably 0.5 to 30 parts by weight, more preferably 1 to 20 parts by weight based on 100 parts by weight of the polyolefin resin.

(Polyurethane Resin)

A polyurethane resin may be used as the sizing agent (A-II). The polyurethane resin used in the present invention can be obtained by addition polymerizing a compound having two hydroxyl groups in the molecule (diol component) and a compound having two isocyanate groups in the molecule (diisocyanate component) in an organic solvent containing no water and no active hydrogen. The polyurethane resin of interest can also be obtained by directly reacting these raw materials in the absence of a solvent.

Examples of the diol component as one of the raw materials include polyol compounds such as polyester diols, polyether diols, polycarbonate diols, polyether ester diols, polythioether diols, polyacetals and polysiloxanes, and glycols such as ethylene glycol having a low molecular weight, 1,4-butanediol, 1,6-hexanediol, 3-methyl-1,5-pentanediol and diethylene glycol. Since the polyurethane resin used in the present invention must be an elastic material having a low elongation, it preferably contains a large amount of a low-molecular weight glycol component which readily forms a hard segment.

The diisocyanate component as the other raw material is an ordinary aromatic diisocyanate or an ordinary aliphatic diisocyanate. Examples of the diisocyanate component include tolylene diisocyanate, xylylene diisocyanate, naphthalene diisocyanate, diphenylmethane diisocyanate, hexamethylene diisocyanate, cyclohexyl diisocyanate, dicyclohexylmethane diisocyanate and isophorone diisocyanate. Since the polyurethane resin used in the present invention must be an elastic material having a low elongation and a high glass transition temperature, it preferably contains a large amount of an aromatic diisocyanate component which readily forms a hard segment.

Since it is preferred that the polyurethane resin should reach the surface of each filament of the fiber, it is suitably applied to the fiber by dipping. Therefore, the polyurethane resin is preferably an aqueous emulsion or suspension and the diameters of its disperse particles are preferably smaller so that they can reach the surface of each filament of the fiber. Specifically, the diameters of the disperse particles are preferably not more than 0.2 μm, more preferably not more than 0.15 μm, much more preferably not more than 0.1 μm. When the diameters of the disperse particles are not less than 0.2 μm, the polyurethane particles do not reach the filaments within the fiber (multi-filament) and can be applied only to filaments on the surface of the fiber by dipping.

The method of dispersing the polyurethane resin into water as an emulsion or suspension is not particularly limited. The polyurethane resin may be self-emulsified by using the hydrophilic group of the resin which has been introduced in advance (emulsion), or the polyurethane resin which cannot be self-emulsified may be dispersed by using a dispersant such as a surfactant (suspension). An emulsion is preferred because the production and stabilization of water dispersed fine particles are easily carried out and is advantageous from the viewpoint of the production equipment. It is fairly possible that the dispersant such as a surfactant required to produce the suspension becomes an impurity in the subsequent step when the resin composition is produced and may impair the physical properties of the resin composition. Therefore, the polyurethane resin used in the present invention is preferably self-emulsifiable.

The method of introducing a hydrophilic group into the polyurethane resin is not particularly limited. For example, the hydrophilic group is obtained by adding a compound having an anion group such as a carboxylate or sulfonate and a cation group such as quaternary amine to part of the dial component or part of the diisocyanate component and copolymerizing them.

Preferably, the polyurethane resin used in the present invention adheres to the surface of each filament of the multi-filament fiber uniformly so as to bundle the filaments. However, in the step of kneading the polyurethane resin with the polyolefin resin, the polyurethane resin must serve to cause the filaments to fall apart by a low shear and disperse into the polyolefin resin. To this end, the dry coating film of the polyurethane resin must be an elastic material having a low elongation, and it is not preferred that it is soft and viscous.

Therefore, the tensile strength of the dry coating film of the polyurethane resin is preferably 10 to 60 MPa, more preferably 20 to 50 MPa. When the tensile strength is lower than 10 MPa, the resin is readily broken and cannot provide bundling property to the fiber. When the tensile strength is higher than 60 MPa, the filaments hardly fall apart in the kneading step and the dispersion of the fiber readily becomes nonuniform.

The elongation of the dry coating film of the polyurethane resin is preferably 1 to 50%, more preferably 5 to 45%, much more preferably 10 to 40%. When the elongation is less than 1%, the resin is readily broken and cannot provide bundling property to the fiber. When the elongation is more than 50%, the filaments hardly fall apart in the kneading step and the dispersion of the fiber readily becomes nonuniform.

The glass transition temperature of the dry coating film of the polyurethane resin is preferably 30 to 100° C., more preferably 40 to 90° C., much more preferably 50 to 80° C. When the glass transition temperature is lower than 30° C., the coating film of the resin becomes viscous, the filaments hardly fall apart in the kneading step, and the dispersion of the fiber readily becomes nonuniform. When the glass transition temperature is higher than 100° C., the resin coating film becomes too hard and tough, and the filaments hardly fall apart in the kneading step.

Preferably, the polyurethane resin has a glass transition temperature of 30° C. close to room temperature or higher preferably 50° C. or higher, and the dry coating film of the polyurethane resin has a low elongation. In this case, bundling property is provided to the fiber until the surface-treated fiber is mixed with the resin, and the fiber can fall apart into filaments easily by a shear during the subsequent step of molding the resin component, thereby obtaining a higher-performance resin composition.

The softening and melting temperature of the polyurethane resin is preferably 80 to 160° C., more preferably 90 to 150° C., much more preferably 100 to 140° C. When the softening and melting temperature is lower than 80° C., not only the resin readily falls off in the drying stage in the dipping step but also the fallen resin adheres to the roller or guide of the dipping equipment in large quantity, thereby greatly deteriorating step passability. When the softening and melting temperature is higher than 160° C., the resin is hardly softened and molten in the heat treatment stage in the dipping step and hardly spread to each filament of the fiber. When the resin has an appropriate softening and melting temperature, the resin is molten in the heat treatment stage in the dipping step and thereby spreads to each filament of the resin uniformly, whereby it serves to bundle the fiber normally.

The coating film of the polyurethane resin can be obtained by removing volatile matter by a casting method using a glass petri dish or a Teflon petri dish. A satisfactory dry coating film can be obtained by suitably setting the treating time at room temperature to about 120° C. according to the sample. The film thickness is preferably 0.1 to 1.0 mm, more preferably 0.5 to 1.0 mm. This film is processed according to measurement. For example, to measure the tensile strength and elongation of the film, the coating film is punched into a dumbbell-like form to prepare a tensile test sample.

(Surface Treating Agent)

The sizing agent (A-II) may contain a surface treating agent to improve wettability and adhesion to the resin component. Examples of the surface treating agent include silane-based coupling agents, titanate-based coupling agents, aluminum-based coupling agents, chromium-based coupling agents, zirconium-based coupling agents and borane-based coupling agents, out of which silane-based coupling agents and titanate-based coupling agents are preferred, and silane-based coupling agents are more preferred.

The silane-based coupling agents include triethoxysilane, vinyl tris((β-methoxyethoxy)silane, γ-methacryloxypropyltrimethoxysilane, γ-glycidoxypropyltrimethoxysilane, β-(3,4-epoxycyclohexyl)ethyl trimethoxysilane, N-β-(aminoethyl)-γ-aminopropyl trimethoxysilane, N-β-(aminoethyl)-γ-aminopropylmethyl dimethoxysilane, γ-aminopropyltriethoxysilane, N-phenyl-γ-aminopropyltrimethoxysilane, γ-mercaptopropyltrimethoxysilane and γ-chloropropyltrimethoxysilane. Out of these, aminosilanes such as γ-aminopropyltriethoxysilane and N-β-(aminoethyl)-γ-aminopropyl trimethoxysilane are preferred.

The content of the surface treating agent in the sizing agent (A-II) is preferably 0.01 to 10 wt %, more preferably 0.02 to 5 wt %.

Another treating agent such as ordinary mineral oil, a lubricant such as fatty acid ester, an emulsifier such as higher alcohol ethylene oxide adduct or ethylene oxide adduct of hardened caster oil, an antistatic agent, a heat resistant agent and a colorant may be used as long as the object of the present invention is not impaired.

(Surface Treatment)

The surface-treated fiber (A) of the present invention is obtained by adhering the sizing agent (A-II) to the surface of the fiber (A-I). Preferably, a bundle of filaments is impregnated with a treating solution containing the sizing agent and dried by heating. It is most preferred from the viewpoints of the retention of the strength of the fiber and the adhesion of the treating agent that the drying temperature should be 80 to 200° C. and that the time should be about 30 to 300 seconds. The drying machine is preferably a non-contact type drying machine in order to maintain the surface state of the fiber.

<Resin Component>

(Modified Polyolefin Resin (B))

The resin composition of the present invention comprises a modified polyolefin resin (B) as a resin component. The modified polyolefin resin (B) is a resin obtained by modifying a polyolefin resin with an unsaturated carboxylic acid and/or an unsaturated carboxylic acid derivative.

The polyolefin resin as the raw material of the modified polyolefin resin (B) is a homopolymer of one olefin or a copolymer of two or more olefins. In other words, the modified polyolefin resin (B) is a resin obtained by reacting a homopolymer of one olefin or a copolymer of two or more olefins with at least one compound selected from the group consisting of an unsaturated carboxylic acid and an unsaturated carboxylic acid derivative and having a partial structure derived from the unsaturated carboxylic acid or the unsaturated carboxylic acid derivative in the molecule. Examples of the modified polyolefin resin (B) include the following modified polyolefin resins (B-a) to (B-c). These modified polyolefin resins may be used alone or in combination of two or more as the modified polyolefin resin (B):

(B-a) a modified polyolefin resin obtained by graft polymerizing a homopolymer of one olefin with an unsaturated carboxylic acid and/or an unsaturated carboxylic acid derivative;

(B-b) a modified polyolefin resin obtained by graft polymerizing a copolymer of two or more olefins with an unsaturated carboxylic acid and/or an unsaturated carboxylic acid derivative; and (B-c) a modified polyolefin resin obtained by graft polymerizing a block copolymer obtained by copolymerizing two or more olefins after an olefin is homopolymerized with an unsaturated carboxylic acid and/or an unsaturated carboxylic acid derivative.

The modified polyolefin resin (B) can be produced by a solution process, bulk process or melt kneading process. These processes may be used in combination of two or more.

Examples of the solution process, bulk process and melt kneading process are described, for example, in "Practical Polymer Alloy Design" (written by Fumio Ide, published by The Institute of Industrial Research (1996)), Prog. Polym,. Sci., 24, 81-142 (1999), JP-A2002-308947, JP-A2004-292581, JP-A 2004-217753 and JP-A 2004-217754.

Commercially available modified polyolefin resins may be used as the modified polyolefin resin (B), such as Modiper (Trade name of NOF Corporation), Blenmer CP (Trade name of of NOF Corporation), Bond First (Trade name of Sumitomo Chemical Co., Ltd.), Bondine (Trade name of Sumitomo Chemical Co., Ltd.), Rexpal (Trade name of Nippon Polyethylene Co., Ltd.), Adomer (Trade name of Mitsui Chemicals Inc.), Modic AP (Trade name of Mitsubishi Chemical Corporation), Polybond (Trade name of Crompton Co., Ltd.) and Umex (Trade name of Sanyo Chemical Industries, Ltd.).

Examples of the unsaturated carboxylic acid which is used to produce the modified polyolefin resin (B) include maleic acid, fumaric acid, itaconic acid, acrylic acid and methacrylic acid. The unsaturated carboxylic acid derivative is an acid anhydride, ester compound, amide compound, imide compound or metal salt of an unsaturated carboxylic acid. Specific examples of the unsaturated carboxylic acid derivative include meleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, 2-hydroxyethyl methacrylate, maleic acid monoethyl ester, maleic acid diethyl ester, fumaric acid monomethyl ester, fumaric acid dimethyl ester, acrylamide, methacrylamide, maleic acid monoamide, maleic acid diamide, fumaric acid monoamide, maleimide, N-butylmaleimide and sodium methacrylate. Citric acid and malic acid which are dehydrated in the step of graft polymerizing a polyolefin to produce an unsaturated carboxylic acid may also be used.

Glycidyl esters of acrylic acid and methacrylic acid, maleic anhydride and 2-hydroxyethyl methacrylate are preferred as the unsaturated carboxylic acid and/or the unsaturated carboxylic acid derivative.

The following resin (B-d) is also preferred as the modified polyolefin resin (B).

(B-d) a resin obtained by graft polymerizing a polyolefin resin which contains a unit derived from at least one olefin selected from ethylene and propylene as the main constituent unit with maleic anhydride, methacrylic acid glycidyl ester or 2-hydroxyethyl methacrylate.

The content of the constituent unit derived from the unsaturated carboxylic acid and/or the unsaturated carboxylic acid derivative in the modified polyolefin resin (B) is preferably 0.1 to 10 wt %, more preferably 0.1 to 5 wt %, much more preferably 0.2 to 2 wt %, particularly preferably 0.4 to 1 wt % from the viewpoints of mechanical strength such as impact strength, fatigue characteristics and stiffness. The content of the constituent unit derived from the unsaturated carboxylic acid and/or the unsaturated carboxylic acid derivative is a value obtained by determining the quantity of absorption based on the unsaturated carboxylic acid and/or the unsaturated carboxylic acid derivative from the infrared absorption spectrum or NMR spectrum.

(Polyolefin Resin (C))

The resin component may further contain a polyolefin resin (C). The polyolefin resin (C) is a resin composed of a homopolymer of one olefin or a copolymer of two or more olefins but not a resin modified with an unsaturated carboxylic acid or an unsaturated carboxylic acid derivative.

Examples of the polyolefin resin (C) include polypropylene resin and polyethylene resin. Polypropylene resin is preferred as the polyolefin resin. These polyolefin resins may be used alone or in combination of two or more.

Examples of the polypropylene resin include a propylene homopolymer, propylene-ethylene random copolymer, propylene-α-olefin random copolymer, propylene-ethylene-α-olefin random copolymer and propylene-based block copolymer obtained by copolymerizing ethylene with propylene after propylene is homopolymerized. A propylene homopolymer and a propylene-based block copolymer obtained by copolymerizing ethylene with propylene after propylene is homopolymerized are preferred as the polypropylene resin from the viewpoint of heat resistance.

The content of ethylene in the propylene-ethylene random copolymer (the total amount of propylene and ethylene is 100 mol %), the content of the α-olefin in the propylene-α-olefin random copolymer (the total amount of propylene and the α-olefin is 100 mol %) and the total content of ethylene and the α-olefin in the propylene-ethylene-α-olefin random copolymer (the total content of propylene, ethylene and the α-olefin is 100 mol %) are all less than 50 mol %. The above content of ethylene, the content of the α-olefin and the total content of ethylene and the α-olefin are measured by the IR or NMR method described in "New Edition of Polymer Analysis Handbook" (edited by the Polymer Analysis Research Committee of the Chemical Society of Japan and published by Kinokuniya Shoten (1995)).

Examples of the polyethylene resin include an ethylene homopolymer, ethylene-propylene random copolymer and ethylene-α-olefin random copolymer. The content of propylene in the ethylene-propylene random copolymer (the total content of ethylene and propylene is 100 mol %), the content of the α-olefin in the ethylene-α-olefin random copolymer (the total amount of ethylene and α-olefin is 100 mol %), and the content of propylene and the α-olefin in the ethylene-propylene-α-olefin random copolymer (the total amount of ethylene, propylene and the α-olefin is 100 mol %) are all less than 50 mol %.

Examples of the α-olefin as a constituent component of the polyolefin resin (C) include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene. The α-olefin is preferably an α-olefin having 4 to 8 carbon atoms (such as 1-butene, 1-pentene, 1-hexene or 1-octene).

The polyolefin resin (C) can be produced by solution polymerization, slurry polymerization, bulk polymerization and vapor-phase polymerization processes. These polymerization processes maybe used alone or in combination of two or more.

A more specific example of the production process of the polyolefin resin (C) is a polymerization process described in "New Polymer Production Process" (edited by Yasuji Saeki and published by the Institute of Industrial Research (1994)), JP-A 4-323207 and JP-A 61-287917.

The catalyst used in the production of the polyolefin resin (C) is a multi-site catalyst or a single-site catalyst. Preferred examples of the multi-site catalyst include catalysts obtained by using a solid catalyst component containing a titanium atom, magnesium atom and halogen atom. Preferred examples of the single-site catalyst include metallocene catalysts.

The preferred catalyst used to produce the polypropylene resin as the polyolefin resin (C) is a catalyst obtained by using a solid catalyst component containing a titanium atom, magnesium atom and halogen atom.

The melt flow rate (MFR) of the polyolefin resin (C) is preferably 1 to 500 g/10 min, more preferably 10 to 400 g/10 min, much more preferably 20 to 300 g/10 min from the viewpoint of preventing a reduction in the dispersibility of the surface-treated polyester fiber (A) in the molded article, the deterioration of the appearance of the molded article and a reduction in impact strength. MFR is a value measured at 230° C. under a load of 21.2 N in accordance with ASTM D1238.

When the polyolefin resin (C) is a propylene homopolymer, its isotactic pentad fraction is preferably 0.95 to 1.0, more preferably 0.96 to 1.0, much more preferably 0.97 to 1.0. The isotactic pentad fraction is a fraction of propylene monomer units existing in the center of an isotactic chain in the pentad unit contained in the propylene molecular chain as measured by the method disclosed in Macromolecules, vol. 6, p. 925 (1973) by A. Zambelli et al., i.e, the method using $^{13}$C-NMR, that is, the chain in which five propylene monomer units are continuously linked together in the meso bond. The assignment of NMR absorption peaks is made by the method described in Macromolecules, vol. 8, p. 687 (1975).

When the polyolefin resin (C) is a propylene block copolymer obtained by copolymerizing ethylene with propylene after propylene is homopolymerized, the isotactic pentad fraction of the above propylene homopolymer is preferably 0.95 to 1.0, more preferably 0.96 to 1.0, much more preferably 0.97 to 1.0.

The resin composition of the present invention comprises the polyolefin resin (B) modified with an unsaturated carboxylic acid and/or an unsaturated carboxylic acid derivative (may be referred to as "unsaturated carboxylic acid or the like" hereinafter) as the resin component. When the content of the unit derived from the unsaturated carboxylic acid or the like in the resin component is the same, the mechanical strength of the resin composition can be kept higher by containing a small amount of the highly modified polyolefin resin (B) in the unmodified polyolefin resin (C) than by using only the polyolefin resin (B) modified with the unsaturated carboxylic acid or the like to a low degree as the resin component. This is because the molecular weight of the modified polyolefin resin (B) tends to be reduced by containing the unsaturated carboxylic acid or the like. Therefore, in the present invention, it is preferred to contain both the modified polyolefin resin (B) and the polyolefin resin (C) as the resin component.

When the resin component contains the polyolefin resin (C), the content of the modified polyolefin resin (B) and the content of the polyolefin resin (C) in the resin component are preferably 0.5 to 40 wt % and 60 to 99.5 wt %, more preferably 0.5 to 30 wt % and 70 to 99.5 wt %, much more preferably 1 to 20 wt % and 80 to 99 wt %, respectively, from the viewpoints of the improvement of the stiffness and mechanical strength of the resin component and the production stability of the resin composition of the present invention.

When the resin component contains the polyolefin resin (C), the content of the surface-treated fiber (A) and the content of the resin component in the resin composition are 1 to 70 wt % and 30 to 99 wt %, more preferably 5 to 68 wt % and 32 to 95 wt %, much more preferably 10 to 65 wt % and 35 to 90 wt %, particularly preferably 15 to 60 wt % and 40 to 85 wt %, most preferably 20 to 55 wt % and 45 to 80 wt %, respectively, from the viewpoints of the improvement of the stiffness and mechanical strength of the resin composition and the appearance of a molded article of the resin composition.

The resin composition of the present invention may be mixed with at least one elatomer as required. Examples of the elastomer include polyester-based elastomers, polyurethane-based elastomers, PVC-based elastomers and mixtures thereof.

The resin composition of the present invention may also be mixed with an antioxidant, a heat-resistant stabilizer, a neutralizer, a stabilizer such as an ultraviolet absorbent, an antifoaming agent, a flame retardant, a flame retardant aid, a dispersant, an antistatic agent, a lubricant, an antiblocking agent such as silica, a colorant such as dye or pigment, a plasticizer, a nucleating agent and a crystallization accelerator.

The resin composition may further be mixed with a lamellar or particulate inorganic compound such as glass flakes, mica, glass powders, glass beads, talc, clay, alumina, carbon black or wollastonite, and whiskers.

<Process for Producing Resin Composition>

The resin composition of the present invention can be produced by the following processes (1) to (3):
(1) a process in which all the components are mixed together to prepare a mixture and the mixture is melt kneaded;
(2) a process in which all the components are combined arbitrarily and mixed together to prepare mixtures, and the mixtures are melt kneaded together;
(3) a pultrusion process.

In the above processes (1) and (2), a Henschel mixer, ribbon blender or blender may be used to mix together the components so as to obtain a mixture(s). A Banbury mixer, plastomill, bravender plastograph, or single-screw or double-screw extruder may be used to melt knead the mixture(s).

The resin composition of the present invention can be produced by a pultrusion process or an electric wire covering process, more preferably a pultrusion process. The pultrusion process and the wire covering method are preferred from the viewpoints of production ease, the mechanical strength such as stiffness and impact strength and damping property of the obtained molded article. The pultrusion process is to impregnate a bundle of filament with the resin while the continuous bundle of filaments is pulled and includes the following techniques (1) to (3):
(1) one in which the fiber bundle is let pass through an impregnation tank containing an emulsion, suspension or solution containing a resin and a solvent to impregnate the fiber bundle with the emulsion, suspension or solution and then the solvent is removed;
(2) one in which, after resin powders are sprayed onto the fiber bundle or the fiber bundle is let pass through a tank containing the resin powders to adhere the resin powders to the fibers, the powders are molten to impregnate the fiber bundle with the resin; and
(3) one in which the molten resin is supplied from an extruder to a cross head while the fiber bundle is let pass through the cross head to impregnate the fiber bundle with the resin.

The resin composition of the present invention is preferably produced by the pultrusion process (3) using the cross head, more preferably by the pultrusion process using the cross head described in JP-A 3-272830.

In the above pultrusion process, the operation of impregnating the resin may be carried out in one stage or at least two stages. A resin composition pellet produced by the pultrusion process and a pellet produced by the melt kneading process may be blended together.

When the pellet is to be injection molded, the length of the pellet produced by the pultrusion process is preferably 2 to 50 mm because a molded article having high strength is obtained without impairing injection moldability. The length is more preferably 3 to 20 mm, particularly preferably 5 to 15 mm. When the total length of the pellet is less than 2 mm, the effect of improving stiffness, heat resistance, impact strength and damping property may be small. When the length is larger than 50 mm, molding may become difficult.

The length of the pellet produced by the pultrusion process and the weight average fiber length of the surface-treated fibers (A) contained in the pellet are equal to each other.

That the length of the pellet is equal to the length of each surface-treated fiber (A) contained in the pellet means that the weight average fiber length measured by separating the surface-treated fibers (A) contained in the pellet in accordance with a known method such as solvent extraction is 90 to 110% of the total length of the pellet.

The weight average fiber length is measured by the method (excluding the ashing step) described in JP-A 2002-5924. That is, the length of each surface-treated fiber (A) is measured by the following steps (ii) to (iv):
(ii) the surface-treated fibers are uniformly dispersed into a liquid whose weight is 1,000 times or more larger than the total weight of the fibers;
(iii) part of the homogeneous dispersion is collected so that the total weight of the fibers becomes 0.1 to 2 mg; and
(iv) the fibers are extracted from that part of the homogeneous dispersion by filtration or drying to measure the fiber lengths of all the fibers.

The length of each surface-treated fiber (A) is equal to the length of the pellet. That is, the weight average fiber length of the surface-treated fibers (A) contained in the pellet is preferably 2 to 50 mm, more preferably 3 to 20 mm, much more preferably 5 to 15 mm. In the resin composition pellet of the present invention, the surface-treated fibers (A) are generally parallel to one another.

<Molded Article>

The present invention includes a molded article obtained from the resin composition of the present invention. The molding techniques include injection molding, injection compression molding and extrusion molding.

The weight average fiber length of the surface-treated fibers (A) contained in the molded article of the present invention is preferably 1 mm or more. The weight average fiber length of the surface-treated fibers (A) contained in the molded article is more preferably 1 to 10 mm from the viewpoints of the mechanical strength, durability and damping property of the molded article.

The applications of the molded article of the present invention include auto parts such as exterior parts which must have mechanical strength, durability, vibration damping property and a good appearance, interior parts which must have heat-resistant stiffness, and engine parts.

The exterior parts include fenders, over-fenders, grille guards, cowl louvers, wheel caps, side protectors, side mouldings, side lower skirts, front grilles, side steps, roof rails, rear spoilers and bumpers. The interior parts include lower instrument panels and trims. The engine parts include bumper beams, cooling fans, fan shrouds, lamp housings, car heater cases, fuse boxes and air cleaner cases.

The applications of the molded article of the present invention also include parts of electric appliances, parts of machines and parts of structures. The parts of electric appliances include electric tools, cameras, video cameras, microwave ovens, electric rice cookers, pots, vacuum cleaners, personal computers, copiers, printers and mechanical housings for FDD and CRT. The parts of machines include pump casings. The parts of structures include tanks, pipes and construction formworks.

EXAMPLES

The following examples are provided for the purpose of further illustrating the present invention but are in no way to be taken as limiting. The evaluation methods in the examples and comparative examples are given below.
(1) Flexural Modulus (unit: MPa)
 This was measured under the following conditions in accordance with ASTM D790.
Measurement temperature: 23° C.
Sample thickness: 3.2 mm
Span: 50 mm
Pull speed: 2 mm/min
(2) Flexural Strength (unit: MPa)
 This was measured under the following conditions in accordance with ASTM D790.
Measurement temperature: 23° C.
Sample thickness: 3.2 mm
Span: 50 mm
Pull speed: 2 mm/min
(3) Izod Impact Strength (unit: kJ/m$^2$)
 This was measured under the following conditions in accordance with ASTM D256.
Measurement temperature: 23° C.
Sample Thickness: 3.2 mm [V-Notched]
(4) Specific Gravity (unit:-)
 This was measured in accordance with ASTM D792.
(5) Weight Average Fiber Length (Unit: mm)
 The resin was removed from the sample by a Soxhlet extraction method (solvent: xylene) to collect fibers so as to measure the weight average fiber length by the method described in JP-A 2002-5924. That is, the length of each surface-treated fiber (A) was measured by the following procedures (ii) to (iv):

(ii) the surface-treated fibers were uniformly dispersed into a liquid whose weight was 1,000 times or more larger than the total weight of the fibers;
(iii) part of the homogeneous dispersion was collected so that the total weight of the fibers became 0.1 to 2 mg; and
(iv) the fibers were extracted from that part of the homogeneous dispersion by filtration or drying to measure the fiber lengths of all the fibers.

EXAMPLE 1

Surface-Treated Fibers ($A_1$)

Polyester fibers ($A_1$) surface treated with an acid modified polyolefin resin were produced.

A polyethylene-2,6-naphthalene dicarboxylate chip having an intrinsic viscosity of 0.62 was used to obtain polyester fibers ($D_1$) having a fineness of 1,100 dtex/250f by a melt spinning stretching method after solid-phase polymerization. The fibers had a filament fineness of 4 dtex and a filament diameter of 20 μm. The fibers had an intrinsic viscosity of 0.90. Since the fibers had a tensile strength of 7.8 cN/dtex, a tensile modulus of 170 cN/dtex, a dry heat shrinkage factor at 180° C. of 6.2% and a high modulus, they had excellent dimensional stability.

A mixture of 26 parts of a polypropylene-maleic anhydride graft polymer as a sizing agent, 52 parts of polyglycerin polyglycidyl ether and 22 parts of an adduct of 7 moles of ethylene oxide (EO) with laurylamine was applied to the untreated fibers ($D_1$) to ensure that the deposition amount of the mixture after drying became 3.0 wt % based on the total weight of the fibers and then heated at 150° C. for 5 seconds with a non-contact heater to obtain the surface-treated fibers ($A_1$).

EXAMPLE 2

Surface-Treated Fibers ($A_2$)

Surface-treated fibers ($A_2$) were obtained in the same manner as in Example 1 except that the deposition amount of the sizing agent after drying was 1.5 wt % based on the total weight of the fibers.

EXAMPLE 3

Surface-Treated Fibers ($A_3$)

Surface-treated fibers ($A_3$) were obtained in the same manner as in Example 1 except that the deposition amount of the sizing agent after drying was 0.2 wt % based on the total weight of the fibers.

EXAMPLE 4

Surface-Treated Fibers ($A_4$)

A polyethylene-2,6-naphthalene dicarboxylate chip having an intrinsic viscosity of 0.62 was used to obtain polyester fibers having a fineness of 1,670 dtex/144f by a melt spinning stretching method after solid-phase polymerization. The obtained fibers had a filament fineness of 13 dtex and a filament diameter of 35 μm. The fibers had an intrinsic viscosity of 0.90. Since the fibers had a tensile strength of 7.9 cN/dtex, a tensile modulus of 170 cN/dtex, a dry heat shrinkage factor at 180° C. of 5.9% and a high modulus, they had excellent dimensional stability.

A mixture of 26 parts of a polypropylene-maleic anhydride graft polymer, 52 parts of polyglycerin polyglycidyl ether and 22 parts of an adduct of 7 moles of ethylene oxide (EO) with laurylamine was applied as a sizing agent to the fibers to ensure that the deposition amount of the mixture after drying became 3.0 wt % based on the total weight of the fibers and then heated at 150° C. for 5 seconds with a non-contact heater to obtain fibers ($A_4$) surface treated with the sizing agent.

EXAMPLE 5

Surface-Treated Fibers ($A_5$)

Polyester fibers ($A_5$) surface treated with a polyurethane resin were produced.

A polyethylene-2,6-naphthalene dicarboxylate chip having an intrinsic viscosity of 0.62 was used to obtain fibers having a fineness of 1,100 dtex/250f by a melt spinning stretching method after solid-phase polymerization. The obtained fibers had a filament fineness of 4 dtex and a filament diameter of 20 μm. The fibers had an intrinsic viscosity of 0.90. Since the fibers had a tensile strength of 7.8 cN/dtex, a tensile modulus of 170 cN/dtex, a dry heat shrinkage factor at 180° C. of 6.2% and a high modulus, they had excellent dimensional stability.

The fibers were dipped in a polyurethane resin treating solution as a sizing agent which had a carboxylate as a hydrophilic component in the molecule and self-emulsified stably in water. This treating solution had a polyurethane resin content of 8 wt % and a water content of 92 wt %, and the water disperse particle diameter of the polyurethane resin emulsion was 61 nm. As for the physical properties of a film obtained by evaporating water as volatile matter from the polyurethane resin treating solution, the coating film had a tensile strength of 35 MPa, an elongation of 30%, a glass transition temperature of 61° C., and a softening and melting temperature of 113° C.

After dipping, the film was dried at 150° C. for 15 seconds with a non-contact heater and then heated at 180° C. for 15 seconds to obtain the fibers ($A_5$) surface treated with a polyurethane resin. The deposition amount of the polyurethane resin solid matter was 3.0 wt % based on 100 parts by weight of the fibers.

EXAMPLE 6

Surface-Treated Fibers ($A_6$)

Polyester fibers ($A_6$) surface treated with a polyethylene resin were produced.

A polyethylene-2,6-naphthalene dicarboxylate chip having an intrinsic viscosity of 0.62 was used to obtain fibers having a fineness of 1,100 dtex/250f by a melt spinning stretching method after solid-phase polymerization. The fibers had an intrinsic viscosity of 0.90. Since the fibers had a tensile strength of 7.8 cN/dtex, a tensile modulus of 170 cN/dtex, a dry heat shrinkage factor at 180° C. of 6.2% and a high modulus, they had excellent dimensional stability.

The fibers were dipped in a polyethylene resin treating solution as a sizing agent which had a carboxylate as a hydrophilic component in the molecule. A small amount of a phosphate-based surfactant was added to the polyethylene resin treating solution to disperse the polyethylene resin into water stably. As for the physical properties of a film obtained by evaporating water as volatile matter from the polyethylene resin treating solution, the film had a tensile strength of 28 MPa, an elongation of 47%, a glass transition temperature of 31° C., and a softening and melting temperature of 128° C. Before dipping, the treating solution had a polyethylene resin content of 10 wt %, a phosphate-based surfactant content of 5 wt % and a water content of 85 wt %, and the water disperse particle diameter of the polyethylene resin suspension was 125 nm.

After dipping, the film was dried at 150° C. for 15 seconds with a non-contact heater and then heated at 180° C. for 15 seconds to obtain the fibers ($A_5$) surface treated with a polyurethane resin. The deposition amount of the polyethylene resin solid matter was 2.5 wt % based on 100 parts by weight of the fibers.

EXAMPLES 7 TO 14

Fiber-Containing Pellet

A 11 mm-long fiber-containing pellet having composition shown in Table 1 was produced in accordance with the method described in JP-A 3-121146. The impregnation temperature was 200° C., and the take-up rate was 13 m/min. That is, the surface-treated fibers ($A_1$ to $A_6$) were impregnated with a resin component supplied from an extruder connected to a cross head die while they were pulled through the cross head die whose channel was undulated, taken up as a strand through a forming die and finely cut to obtain a fiber-containing pellet.

The modified polypropylene resin (B-1) was a maleic anhydride modified polypropylene resin (MFR=60 g/10 min, amount of graft polymerized maleic anhydride=0.6 wt %). The maleic anhydride modified polypropylene resin was produced in accordance with the method described in Example 1 of JP-A 2004-197068.

The unmodified polypropylene resin (C-1) was a propylene homopolymer (MFR=120 g/10 min).

The specific gravity, flexural modulus, flexural strength, Izod impact strength and weight average fiber length of the obtained fiber-containing pellet were evaluated by using the following molding machine of The Japan Steel Works, Ltd. and an injection molded evaluation sample under the following conditions. The results are shown in tables.

[Molding Machine]
molding machine: J150E molding machine of The Japan Steel Works, Ltd.
clamping force: 150 t
screw: deep groove screw
screw diameter: 46 mm
L/D of screw: 20.3
[Molding Conditions]
cylinder temperature: 200° C.
mold temperature: 50° C.
back-pressure: 0 MPa

COMPARATIVE EXAMPLE 1

A fiber-containing pellet was produced and evaluated in the same manner as in Example 7 except that the untreated polyester fibers ($D_1$) were used in place of the surface-treated polyester fibers ($A_1$).

COMPARATIVE EXAMPLE 2

A pellet was produced and evaluated in the same manner as in Example 7 except that the total amount of the surface treated polyester fibers ($A_1$) was changed to 20 parts by weight, the modified polypropylene resin (B-1) was not used, and the amount of the polypropylene resin (C-1) was changed to 80 parts by weight.

TABLE 1

| | Items | Ex. 7 | Ex. 8 | Ex. 9 | Ex. 10 | Ex. 11 | Ex. 12 | Ex. 13 |
|---|---|---|---|---|---|---|---|---|
| Composition | Surface treated polyester fibers | | | | | | | |
| | Type of treating agent | Acid modified polypropylene resin | | | | Polyurethane resin | | |
| | Type of fiber | $A_1$ | $A_2$ | $A_3$ | $A_4$ | $A_5$ | $A_5$ | $A_5$ |
| | Filament fineness (dtex) | 4 | 4 | 4 | 13 | 4 | 4 | 4 |
| | Filament diameter (μm) | 20 | 20 | 20 | 35 | 20 | 20 | 20 |
| | Amount (parts by weight) | 17 | 17 | 17 | 22 | 17 | 20 | 26 |
| | Modified polypropylene resin | | | | | | | |
| | Type of resin | B-1 | B-1 | B-1 | B-1 | B-1 | B-1 | B-1 |
| | Amount (parts by weight) | 4 | 4 | 4 | 4 | 4 | 4 | 4 |
| | Polypropylene resin | | | | | | | |
| | Type of resin | C-1 | C-1 | C-1 | C-1 | C-1 | C-1 | C-1 |
| | Amount (parts by weight) | 79 | 79 | 79 | 74 | 79 | 76 | 70 |
| | Others | | | | | | | |
| | Type of fiber | | | | | | | |
| | Filament fineness (dtex) | | | | | | | |
| | Filament diameter (μm) | | | | | | | |
| | Amount (parts by weight) | | | | | | | |
| Evaluation results | Tensile strength (MPa) | 75 | 73 | 73 | 68 | 65 | 67 | 75 |
| | Flexural modulus (MPa) | 2460 | 2440 | 2380 | 2890 | 2790 | 3000 | 3690 |
| | Flexural strength (MPa) | 65 | 66 | 66 | 72 | 68 | 72 | 82 |
| | Izod impact strength (kJ/m$^2$) | 42 | 38 | 30 | 46 | 40 | 44 | 89 |
| | Specific gravity | 0.96 | 0.96 | 0.96 | 0.98 | 0.97 | 0.97 | 1.02 |
| | Residual weight average fiber length (mm) | 8 | 8 | 8 | 8 | 8 | 8 | 8 |

| | Items | Ex. 14 | C. Ex. 1 | C. Ex. 2 |
|---|---|---|---|---|
| Composition | Surface treated polyester fibers | | | |
| | Type of treating agent | Polyethylene resin | | |
| | Type of fiber | $A_6$ | D1 | $A_1$ |
| | Filament fineness (dtex) | 4 | 4 | 4 |
| | Filament diameter (μm) | 20 | 20 | 20 |
| | Amount (parts by weight) | 23 | | |
| | Modified polypropylene resin | | | |
| | Type of resin | B-1 | B-1 | |
| | Amount (parts by weight) | 4 | 4 | |
| | Polypropylene resin | | | |
| | Type of resin | C-1 | C-1 | C-1 |
| | Amount (parts by weight) | 73 | 79 | 80 |
| | Others | | | |
| | Type of fiber | | $D_1$ | |
| | Filament fineness (dtex) | | 4 | |
| | Filament diameter (μm) | | 20 | |
| | Amount (parts by weight) | | 17 | |
| Evaluation results | Tensile strength (MPa) | 68 | 69 | 59 |
| | Flexural modulus (MPa) | 2830 | 2420 | 2440 |
| | Flexural strength (MPa) | 67 | 62 | 65 |
| | Izod impact strength (kJ/m$^2$) | 45 | 20 | 24 |
| | Specific gravity | 0.97 | 0.96 | 0.98 |
| | Residual weight average fiber length (mm) | 8 | 8 | 8 |

Ex.: Example
C. Ex.: Comparative Example

EFFECT OF THE INVENTION

The resin composition of the present invention can provide a molded article having excellent mechanical strength such as flexural strength and impact resistance. Since a molded article having a low specific gravity is obtained from the resin composition of the present invention, the resin composition is suitable for use in the production of a molded article which must be light in weight.

A molded article having excellent mechanical strength such as flexural strength and impact resistance can be provided when the surface-treated fibers (A) of the present invention are contained in the modified polyolefin resin (B).

INDUSTRIAL FEASIBILITY

The resin composition and molded article of the present invention can be used in auto parts.

The invention claimed is:
1. A resin composition comprising
(i) a surface-treated fiber (A) which comprises 100 parts by weight of a fiber (A-I) comprising a polyalkylene terephthalate and/or a polyalkylene naphthalene dicarboxylate and 0.1 to 10 parts by weight of a sizing agent (A-II) adhered to the surface of the fiber (A-1), and (ii) a polyolefin resin modified with an unsaturated carboxylic acid and/or an unsaturated carboxylic acid derivative (a modified polyolefin resin (B) as a resin component;

wherein the sizing agent (A-II) comprises a mixture of a polyolefin resin and an ethylene oxide adduct and/or propylene oxide adduct of an aliphatic amine compound.

2. The resin composition according to claim 1 which comprises 1 to 70 wt % of the surface-treated fiber (A) and 30 to 99 wt % of the resin component, the resin component containing 0.5 to 40 wt % of the modified polyolefin resin (B) and 60 to 99.5 wt % of a polyolefin resin (C).

3. The resin composition according to claim 1, wherein the polyolefin resin of the sizing agent (A-II) is a resin modified with an unsaturated carboxylic acid and/or an unsaturated carboxylic acid derivative.

4. The resin composition according to claim 1, wherein the surface-treated fiber (A) comprises 100 parts by weight of the fiber (A-I), 0.1 to 2.0 parts by weight of a polyolefin resin modified with an unsaturated carboxylic acid and/or an unsaturated carboxylic acid derivative, and 0.1 to 1.0 part by weight of an epoxy compound having two or more epoxy groups in one molecule.

5. The resin composition according to claim 1, wherein the surface-treated fiber (A) has a weight average fiber length of 2 to 50 mm and a pellet-like form.

6. A molded article obtained from the resin composition of claim 1.

7. The molded article according to claim 6 which is an interior part or exterior part for automobiles.

* * * * *